No. 769,406. PATENTED SEPT. 6, 1904.
G. RENNERFELT.
MEANS FOR CONTROLLING AND REGULATING ELECTRIC MOTORS.
APPLICATION FILED NOV. 9, 1903.
NO MODEL. 3 SHEETS—SHEET 2.

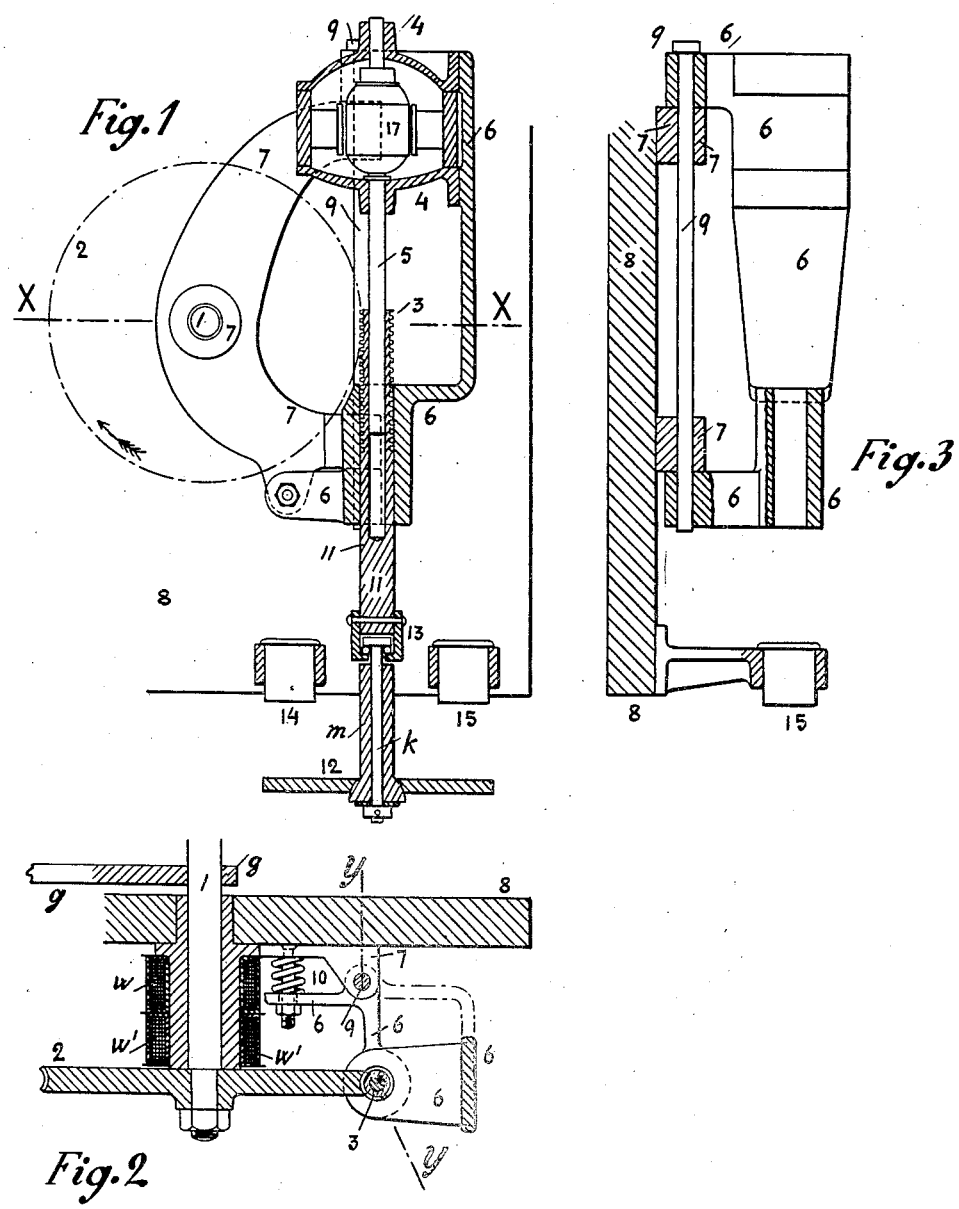

WITNESSES:
INVENTOR
Gustaf Rennerfelt
BY Charles J. Kintner
ATTORNEY

No. 769,406. PATENTED SEPT. 6, 1904.
G. RENNERFELT.
MEANS FOR CONTROLLING AND REGULATING ELECTRIC MOTORS.
APPLICATION FILED NOV. 9, 1903.
NO MODEL. 3 SHEETS—SHEET 3.
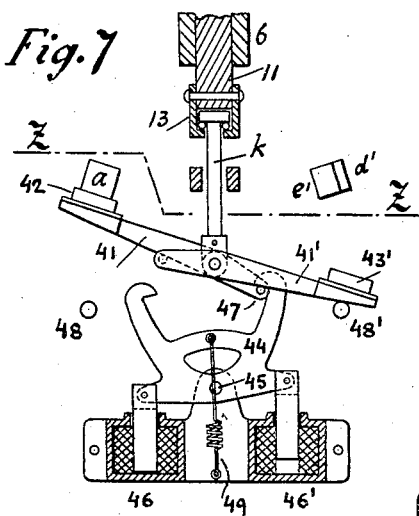
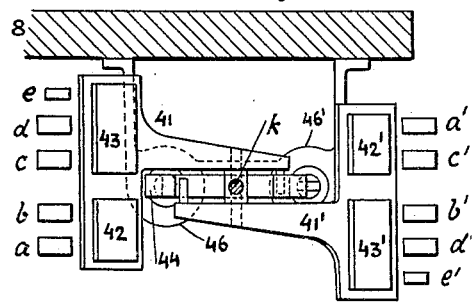
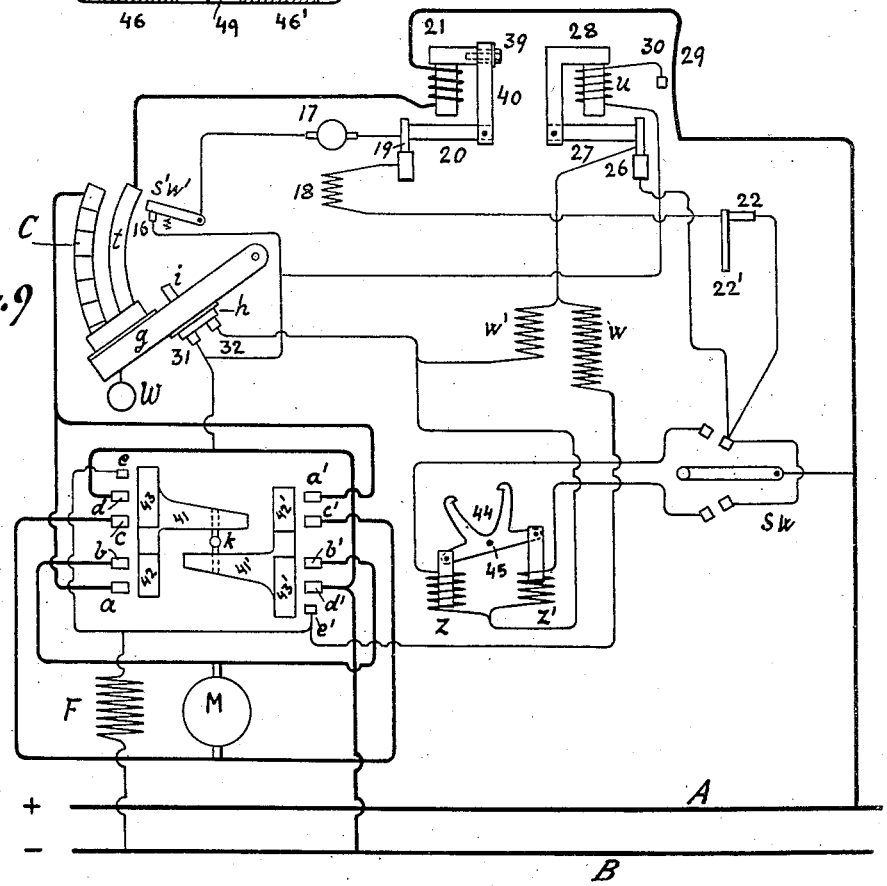
Witnesses
M. F. Keating
J. ...
Inventor
Gustaf Rennerfelt No. 769,406. Patented September 6, 1904.

UNITED STATES PATENT OFFICE.

GUSTAF RENNERFELT, OF NEW YORK, N. Y.

MEANS FOR CONTROLLING AND REGULATING ELECTRIC MOTORS.

SPECIFICATION forming part of Letters Patent No. 769,406, dated September 6, 1904.

Application filed November 9, 1903. Serial No. 180,447. (No model.)

*To all whom it may concern:*

Be it known that I, GUSTAF RENNERFELT, a subject of the King of Sweden and Norway, residing at New York, borough of Manhattan, county and State of New York, have made a new and useful Invention in Means for Controlling and Regulating Electric Motors, of which the following is a specification.

My invention has for its objects, first, to provide means for preventing the abnormal flow of current through an electric motor upon starting the same; second, to provide means for preventing abnormal speeding of an electric motor upon starting the same; third, to provide novel means for automatically rupturing the current flow through an electric motor in the event of an overheating of the same; fourth, to devise apparatus in which all the aforesaid three objects will result automatically and in which the manual operation shall be limited to the closing of a single electrical contact, and, fifth, to so arrange said apparatus that a minimum amount of energy will be wasted in its operation and also so that it shall be simple and cheap in construction.

My invention will be fully understood by referring to the accompanying drawings, in which—

Figure 4:
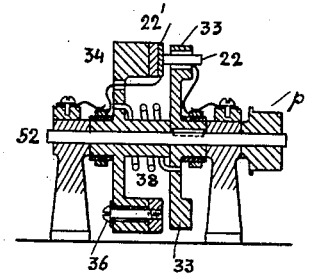
Figure 5:
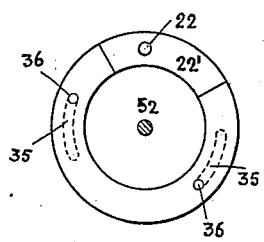
Figure 6:
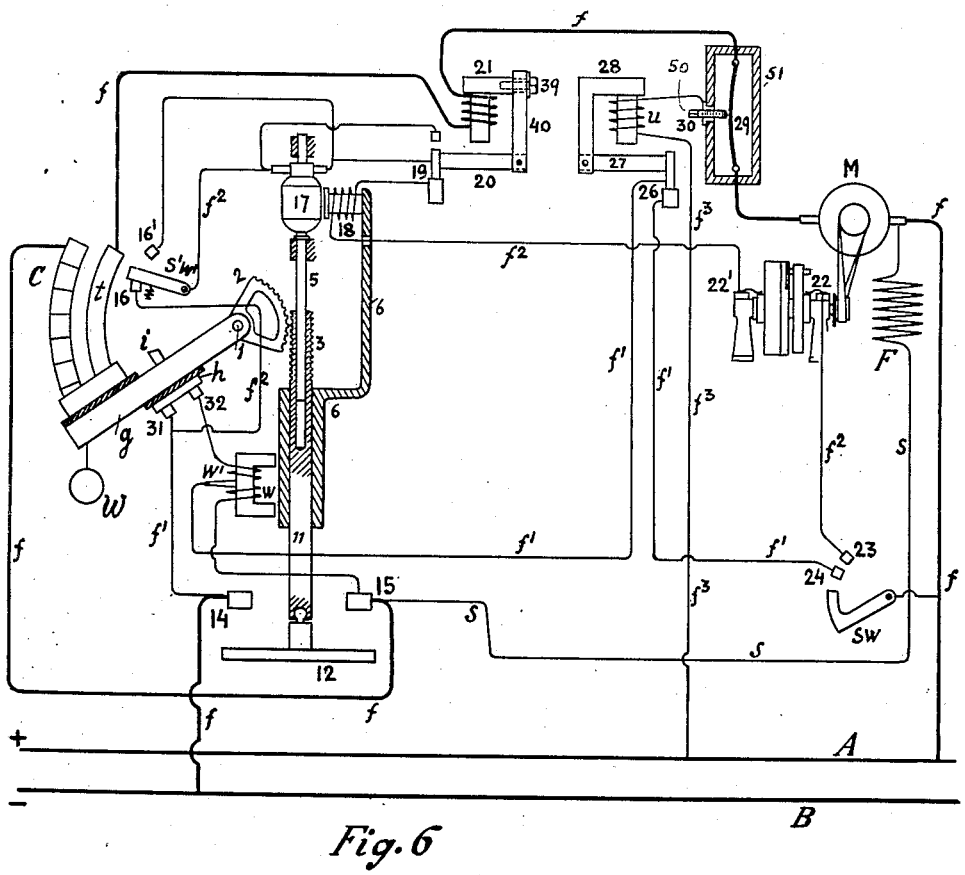

Figure 1 is a side elevational view of a part of the controlling apparatus supported upon an insulating base or board, the lower portion of said apparatus being shown in sectional view. Fig. 2 is a detail sectional view taken through Fig. 1 on the line X X and as seen looking thereat from the top toward the bottom of the drawings. Fig. 3 is a part side elevational part-sectional view taken through Fig. 2 on the broken line Y Y and as seen looking thereat from left to right. Fig. 4 is a detail sectional view of that portion of the apparatus which prevents a too-sudden starting of the motor; and Fig. 5 is a sectional view taken through the body of Fig. 4 and as seen looking thereat from right to left. Fig. 6 is a diagrammatic view illustrating the current-mains, branch feeders, and the motor to be controlled, together with my novel apparatus, circuits, and circuit connections as applied thereto. Fig. 7 is a view of the switching parts similar to the like parts shown in Fig. 1 with a reversing-switch instead of a single switch. Fig. 8 is a horizontal sectional view of Fig. 7, taken on the line Z Z, with the switching parts shown in plan, the manner of attaching the same to the switchboard being also shown. Fig. 9 is a diagrammatic view similar to Fig. 6, but illustrating the circuit connections and application or use of the reversing-switch (shown in Figs. 7 and 8) in relation thereto.

In the use of electric motors as heretofore regulated and controlled an attendant may often carelessly switch the current through the motor in such quantity as to seriously damage the same, and particularly is this true when the motor is carrying or moving a relatively heavy load. It also often occurs that the motor may be started with greater acceleration than desirable, and particularly is this true when the motor is moving a relatively light load. My invention is designed to overcome these objections, and to this end I use a pilot-motor for intermittently moving the regulator, its movement being stopped when the starting-current exceeds a predetermined limit and also when the acceleration rate exceeds a predetermined limit, and means are provided whereby both of said limits can be easily adjusted, so that the same apparatus may be used for different motor installations with varying requirements.

My invention also comprises novel apparatus whereby the motor itself when started too suddenly will act so as to automatically prevent further moving of the regulator, and this I effect through the agency of an acceleration-controller not generically different from that disclosed in a prior patent granted to me on the 16th day of May, 1899, by the United States Patent Office and bearing No. 625,060, so combining the same with the pilot-motor that its circuit is interrupted.

Referring now to the drawings in detail for a full and clear understanding of my invention, in all of which like numerals and letters of reference represent like parts wherever used, and first to Fig. 1, 8 represents the controller-switchboard, made, preferably, of marble or other insulating material, and 4 a pilot-motor for regulating the movement of the controller, the armature and field circuits of said motor being located in a branch circuit $f^2$, controlled by an operating-switch S$w$, as will be more particularly described in connection with the description of the diagrammatic view illustrated in Fig. 6 and the mode of operation thereof which follows. 5 is a driving-shaft connected to the armature of the pilot-motor 4 and provided with a spline-pin which is adapted to move in a spline-slot (see Fig. 2) in a hollow shaft 11, having a worm 3. To the lower end of the shaft 11 is secured a hollow collar 13, provided with internally-arranged ball-bearings, adapted to sustain by a head a stem $k$, which supports, through an insulating-sleeve $m$, a metallic or other conducting switching bar or disk 12, the free ends of which are adapted to contact when said bar is drawn to its upper position by the pilot-motor 4 with yielding switching-contacts 14 15, the arrangement being such that by reason of the ball-bearings the switching bar or disk 12 will not be rotated with the shaft. The motor 4 and hollow shaft 11 are supported in an iron frame 6, pivotally secured by means of a rod 9 to a frame 7, which is supported by the switchboard 8 and in which is journaled the shaft 1 of the worm-wheel 2, the arrangement being such that through the rocking of the frame 6 around the rod 9 the worm 3 may be moved into and out of mesh with the worm-wheel 2, as clearly illustrated. The rocking of the frame 6 for causing said mesh is effected through an electromagnet placed in suitable position. In the drawing Fig. 2 said magnet is illustrated by two windings $w\ w'$ of insulated wire connected in the switching-circuit in a manner to be hereinafter described, the function of said windings $w\ w'$ being to magnetize the iron shaft 1, worm-wheel 2, frames 6 and 7, and hence complete the magnetic circuit between the worm-wheel 2 and the worm 3, so as to thereby bring said worm and worm-wheel into operative relation with each other. 10 is a spiral spring located between an extension of the pivoted frame 6 and the frame 7, a nut and a bolt being provided for limiting the outward throw of the pivotal parts, so that when the windings $w\ w'$ are not energized the worm 3 will be just out of mesh with the worm-wheel 2.

Referring now to Figs. 4 and 5, I will describe the acceleration-controller, which is not generically different from the like apparatus disclosed in my before-mentioned patent, in which patent, however, said acceleration-controller was combined with brake mechanism, the novelty, in so far as this feature is concerned in the present application, lying in improved detail construction and in the combination of such an acceleration-controller with the regulator in the manner to be hereinafter described and as particularly pointed out in the claims which follow. This acceleration-controller is composed of a shaft 52, journaled in standards, as shown, and provided with a driving-pulley $p$ at its outer end, adapted to be geared to the motor to be controlled by a belt or otherwise. Upon the shaft is loosely journaled a fly-wheel 34, provided with a contact-plate 22', secured to but insulated from the lateral face thereof and electrically connected to a contact-ring carried on the outer end of the hub of the fly-wheel and making continuous contact with a brush connected to a binding-post, as shown. To the interior of the fly-wheel is secured a spiral spring 38, wound around an extended interior hub and having its free end connected directly to a disk or arm 33, provided with a hub keyed to the shaft 52 and carrying a second contact-ring, which is electrically connected to a yielding contact-point 22, adapted to make contact with the contact-plate 22', 36 36 being bolts (see Fig. 5) located in curved slots 35 35 and so arranged that the initial relative position of the contacts 22 22' may be adjusted. The contact-ring last referred to is connected in turn by a brush to a second binding-post, as shown.

Referring now to the diagram for a full and clear understanding of the circuits and circuit connections and the manner of connecting up and using the entire apparatus, A and B represent, respectively, positive and negative current-mains connected to a source of electrical energy. (Not shown.) M represents the armature of the motor to be controlled, and F the field thereof. C represents any well-known type of controller, here shown as a series of resistances provided with a controller-arm $g$, carried directly by the shaft 1, driven by the pilot-motor 4, (see Figs. 1 and 2,) 17 being the armature, and 18 the field-coil, of said motor. (See Fig. 6.) $f$ is the motor-circuit running from the current-main A through the armature of the motor and the controller apparatus to the negative main B, and $s$ is a shunt-circuit therefrom including the field F of the motor. $f'\ f^2\ f^3$ are conductors which connect the several parts of the apparatus together and to the current feeders or mains, as will be more fully described in connection with the description of the mode of operation. W is a weight carried at the free end of the arm $g$, and $h$ is a contact-plate located on one side of said arm and adapted to make electrical contact with two stationary contacts 31 32. $i$ is a pin located on the opposite side of the arm $g$ and adapted to operate a switch $s'\ w'$ in such manner as to open the circuit of the pilot-motor and to short-circuit its armature 17 when the arm $g$ reaches its upper limit and all of the resistance of the controller C is cut out of circuit between it and the curved contact-plate $t$. 21 28 are controlling-electromagnets adapted to operate upon armatures 20 and 27 in a manner to be hereinafter specified. 29 and 30 represent parts of a thermostatic cut-out device, 30 being a contact connected to one end of a magnet-winding $u$, and 29 a bare metallic strip carrying the main current of the motor M. Said strip 29 consists of two bands of metal soldered together, having different coefficients of expansion, such as copper and zinc. When this strip is heated by the action of the current, it will assume a curved shape, the zinc being on the outside or convex side, and the contact 30 is so adjusted by set-screw 50 that it will be touched by strip 29 when said strip has reached a certain temperature. This bare metallic strip 29 may preferably be so incased that its facility for cooling may be approximately the same as that of the armature-conductors of the motor M. One mode of incasing said strip 29 is illustrated in Fig. 6 at 51, which may indicate a box surrounding the strip, so as to protect it from the direct cooling action of the air. The facility of the strip for cooling will thus resemble that of the conductors on motor M, and being heated by the same current which heats said conductors its temperature will vary with their temperature—that is, the temperature of the strip will depend on the temperature of the motor which it is to protect. Hence it follows, for instance, that a moderate current acting on the motor and warming it up during a considerable time may heat the strip enough to cause it to close the circuit at contacts 29 30 and, as hereinafter described, effect the opening of the motor-circuit, while, on the other hand, a much stronger current acting for a short time may not cause that result, especially if the motor, and thus the strip, are fairly cool, as will be the case upon starting the motor after a fairly long rest.

I will now describe the operation of the entire apparatus, the circuit being shown as broken at the operating-switch S$w$. As illustrated in Fig. 6, when the motor to be controlled is disconnected from the circuit by opening the switch S$w$ all of the resistances of the controller C are connected in series relation through the branch feeder $f$, contact-plate $t$, and armature of the motor, and the switching-bar 12 is in its lower position. Upon closing the circuit at the switch S$w$ current flows from the positive-current main A by way of the branch feeder $f$ through switch S$w$, contact 24, conductor $f'$, circuit making and breaking contacts 26, coil $w'$ of the compound coil $w$ $w'$, through contact-point 32, contact-plate $h$, contact-point 31, contact-point 14, branch feeder $f$ to the negative main B. Consequently the worm 3 is drawn into mesh with the worm-wheel 2. At the same time a branch circuit is closed from the switch S$w$ through the contact-point 23, conductor $f^2$, yielding contact-point 22, and contact-plate 22' of the acceleration-controller, Fig. 4, through the field-coil 18, current-interrupting contacts 19, and armature 17 of the pilot-motor 4. Then by the switch $s'$ $w'$, contact 16, conductor $f^3$, conductor $f'$, contact 14, branch feeder $f$ to the negative main, so that the armature of the motor is set in motion. Consequently the driving-shaft 5 of the pilot-motor 4 is rotated, and hence the hollow shaft 11 is also rotated; but inasmuch as the arm $g$, carried by the shaft 1, together with the weight W, preponderates or is greater than the weight of the shaft 11 and switching-bar 12 the latter will be moved upward, the gear of the worm-wheel 2 acting as a nut and causing this upward movement to continue until the switching-bar 12 is brought into firm electrical and mechanical contact with the yielding contacts 14 and 15 at the points of extreme upper movement. After this occurs rotary motion is still given to the worm 3, and now additional work is put upon the armature of the motor and the worm transmits to the worm-wheel rotary motion in the direction of the arrow, Fig. 1, thus causing the conducting-plate carried at the outer end of the arm $g$ to cut out the successive coils of resistance in the controller or regulator, and hence to start and increase the speed of the armature M of the motor to be controlled. When the arm $g$ reaches its extreme upper limit, the pin $i$ is brought into mechanical contact with the free end of the switch $s'$ $w'$, shifting the same from connection with the contact 16 into connection with the contact 16', thereby interrupting the circuit of the pilot-motor 4 and short-circuiting the armature 17 thereof, thus quickly stopping the same. It is to be noted, however, at this time that the arm $g$, carried by the shaft 1, will not return to its off position under the influence of the weight W after the pilot-motor has been thus stopped, owing to the fact that when the switching-bar 12 reached its upper limit and before the arm $g$ was moved from its normal position the circuit was closed through the other coil $w$ of the compound coil $w$ $w'$, switch-contact 15, switching-bar 12, switch-contact 14, and branch feeder $f$, so that although the circuit was interrupted between the contact-plate $h$ and contacts 31 32 when the arm $g$ started on its upward journey the worm 3 will still be held in mesh with the worm-wheel 2 so long as the circuit be maintained closed through this branch $w$ of the compound coil. Consequently the arm $g$ will be held in its upper position, and the counterweight W, acting through the worm-wheel 2 on the worm 3, will press on the switching conducting-bar 12 against the contacts 14 15. This pressure prevents the shaft 1 of the regulator from rotating under the influence of the counterweight until the circuit through the winding $w$ be interrupted either at the switch S$w$ or at the contact 26 or by cessation of the voltage. When circuit $f'$ is opened either at 24 or at 26, the worm and worm-wheel will be put out of mesh by reason of the spring 10 and the obliquely-directed cog-pressure, and hence it follows that the shaft 11, with switching-bar 12, will drop, opening the motor-circuit at 14 and 15. The arm $g$ of the regulator will also drop by reason of the counterweight W and return to its off position, and the switch $s'$ $w'$ will be returned to contact 16, actuated by its spring or weight. It will be noted that contact between 14 and 15 cannot again be established before the arm $g$ of the regulator has actually reached its off position, so that contact is made between 31 and 32 in the circuit of the winding $w'$. Hence the motor M can never be started before all its starting resistance is in circuit. The contact 26 is opened in case of a prolonged overload on the motor M in the following manner: The main current of the motor M passing through the thermostatic device 29 will cause the same to close the branch circuit through the contact 30, coil $u$ of magnet 28, and branch conductor $f^3$, thereby interrupting the circuit running to the coil $w$. It will be noted that no sparking can ever occur at the contact between 29 and 30, since the making of said contact will cause 29 to lose its current. After the thermostatic device cools sufficiently it will break contact at 30, and the motor M will then again start automatically, provided that the operating-switch S$w$ remains closed, and it will be readily understood that the preferred manner of closing said switch S$w$ will depend upon the nature of the service which the motor has to perform. To illustrate, this mode of operation will be different if the motor is called upon to drive an elevator from that of driving a pump feeding water into a tank. When the circuit $f^2$ is opened either at 16, 19, 22, or 23, the circuit of the pilot-motor is broken, and said pilot-motor will stop more or less quickly, and the movement of the regulator will be temporarily arrested. The contact 19 is broken in case the starting-current of the motor M exceeds a predetermined limit and in the following manner: The electromagnet 21 is energized by the main current, and when said current reaches a certain strength the armature 20 carrying one of the contacts 19 will be lifted. If so desired, this movement will also short-circuit the armature 17 of the pilot-motor for the purpose of stopping it quickly. The necessary adjustment of the magnet 21 for different limits of starting-current is effected by varying the length of the air-gap of the magnet 21, and this is done by clamping with the screw 39 the vertical member 40 higher or lower in relation to the magnet-core. The contact 22 is opened by the acceleration-controller, (illustrated in Figs. 4 and 5,) and I will now describe the operation of said apparatus upon the assumption that the same is mechanically connected or geared to the shaft of the motor M through a belt or otherwise. It will be apparent that should an abnormal current-flow be passed through the motor, so as to start it too suddenly when running without load or with a light load, the inertia of the fly-wheel 34 will cause it to lag, so as to effect an interruption of the circuit between the contact-plate 22' and the yielding contact 22, thus stopping the pilot-motor and preventing further movement of the regulator until the acceleration rate of the motor M is reduced so as to allow the contact-plate 22' to catch up with the contact 22, and thus reëstablish the circuit of the pilot-motor, so that it may again move the regulator for obtaining further increase in speed of the motor M, such an arrangement making it possible to thus automatically prevent any sudden starting of the motor M and to continuously effect such operation until the desired speed has been attained.

The necessary adjustment of this apparatus for any desired limit of acceleration is effected by varying the initial relative position of contacts 22 and 22', and this is done by shifting the contact-plate 22' on the fly-wheel in relation to the spring 38. I prefer this mode of adjustment as being simpler than varying the strength of the spring, the inertia of the fly-wheel, or the angular breadth of the contacts, although my claims are intended to cover any manner of effecting this adjustment.

Referring now to Fig. 7, the shaft 11, rotated by the previously-mentioned shaft 5 of the pilot-motor 4, is connected with two levers 41 and 41', of which one at a time is adapted to be lifted, so that by means of switching-bars 42 43 contact is made between $a$ $b$ and between $c$ $d$ $e$ for the running of the motor M in one direction, and likewise by means of switching-bars 42' 43' contact is made between $a'$ $c'$ and between $b'$ $d'$ $e'$ for running in the opposite direction. The circuit connections for this reversing-switch are clearly shown in diagram in Fig. 9. Whether lever 41 or lever 41' will be lifted is determined by the position of the rocking lever 44, which is adapted to swing to the right or left on a pivot 45. This rocking of the lever is caused by one or the other of two magnets 46 46', and the arrangement is such that one of the levers 41 will be engaged by the rocking lever, which will furnish a fulcrum 47 for the proper lever while it is lifted, so as to establish the contacts for running in one direction. The other lever, 41', of which the fulcrum is located on the stop 48', will only be lifted to the extent shown in Fig. 7 and will make no contacts on its respective side. It will be noted from the diagram in Fig. 9 that the magnet-windings $z$ $z'$, operating the rocking lever 44, are coupled to contact 32, so that they receive no current after the regulator-arm $g$ has left its off position, and they are therefore not apt to heat. A spring 49 (see Fig. 7) keeps the rocking lever in its position, either to the right or left. It will be noted in Figs. 6 and 9 that during the running of the motor M there is of the entire controlling apparatus only one winding—namely, $w$—which is all the time energized. This winding $w$ acts on a magnetic circuit which has no air-gap, so that the winding $w$ requires only a few ampere-turns. For these reasons it is claimed that only a minimum of energy is wasted in the operation of the apparatus here described.

I do not limit my invention to the details of structural apparatus illustrated in the accompanying drawings and hereinbefore described, as many of the features may be materially departed from and still come within the scope of my claims hereinafter made.

I believe it is broadly new with me to so devise and arrange a controlling apparatus for an electric motor that the operating-switch, by which the current is turned on and disconnected from the motor, may be manipulated at will without conveying to the motor abnormal currents. I believe it is broadly new with me to combine a circuit-interrupting acceleration-controller with an electric motor in such manner that on a too sudden start of the motor the movement of its regulator will be stopped or prevented. I believe it is also broadly new with me to regulate the movement of a controller for an electric motor by a pilot-motor so interconnected with switching mechanism that the entire operation of control is automatically effected and that the least possible attention is required on the part of the manipulation of the operating-switch and that the least possible amount of energy is wasted in the operation of the switching mechanism.

Having thus described my invention, what I claim, and desire to secure by Letters Patent of the United States, is—

1. In apparatus for regulating electric motors the combination of a motor and controller therefor with means for automatically operating the controller so as to obtain an increase in speed of the motor, and means for stopping said operating means when the rate of speed increase exceeds a predetermined limit.

2. The combination of an electric motor, an automatic regulator for increasing the speed thereof, and an acceleration-controller for stopping the operation of said regulator when the rate of acceleration is greater than a predetermined amount.

3. An acceleration-controller consisting of a rotary disk or arm connected to and driven by the machine to be controlled; a fly-wheel driven through yielding means connected to said disk or arm; electric contacts located on the arm and the fly-wheel, and means for adjusting the initial relative position of said electric contacts.

4. The combination of an electric motor; a regulator for increasing the speed of said motor; a contact driven through rigid means by the motor, and a contact driven at the same average speed through yielding means by the motor; in combination with means operated by the contacts for stopping the regulator.

5. An electric motor provided with an automatic regulator adapted to successively increase the speed of the motor; in combination with an acceleration-controller connected to and driven by the motor and adapted to stop the regulator when the acceleration rate exceeds a predetermined limit.

6. The combination of an electric motor; an automatic regulator and an adjustable acceleration-controller all coöperating substantially as described.

7. The combination of an electric motor, a switch and a regulator therefor; means for closing the switch and for moving the regulator; together with means for automatically stopping said movement when the starting-current exceeds a predetermined amount.

8. The combination of an electric motor, a switch and a regulator for the motor; a pilot-motor for closing the switch and for operating the regulator; together with means for stopping the pilot-motor when the starting-current exceeds a predetermined limit.

9. The combination of an electric motor, a switch and a regulator for the motor; a pilot-motor for operating said switch and regulator, and an electromagnet having an armature operatively connected with contacts for breaking the circuit of said pilot-motor when the starting-current exceeds a predetermined amount.

10. The combination of an electric motor, a switch for said motor, a magnet-winding for holding said switch closed, a magnet for opening said winding, a thermostatic device actuated by an overload of current, said magnet becoming operatively energized upon the overheating of the thermostatic device.

11. The combination of an electric motor, a controlling-switch for said motor and means for releasing said switch, said means being operated by a magnet energized by current derived from the motor-circuit and conveyed through a metallic strip adapted to be heated so as to close the derived circuit.

12. The combination of an electric motor, a regulator for said motor, a pilot-motor for operating the regulator, and means for opening the circuit of said pilot-motor when the regulator has been moved to its limit; together with means for moving or shifting the pilot-motor so as to disconnect it from the regulator.

13. The combination of an electric motor with a switch; a regulator; a pilot-motor for closing the switch, and means dependent on the load upon the motor for intermittently operating the regulator through the agency of the pilot-motor.

14. The combination of an electric motor, a main switch for said motor, a rotary pilot-motor for closing the switch, a magnet-winding for retaining the switch in closed position and means for opening said magnet-winding.

15. The combination of an electric motor; a regulator; a pilot-motor mounted on a frame, and means for shifting the frame so as to connect or disconnect the pilot-motor from the regulator.

16. An electric motor provided with an operating-switch Sn, a main switch, a speed-controller and a pilot-motor for controlling the movements of the main switch and said speed-controller; together with means dependent on the load upon the motor whereby the current can only be passed through the motor in intermittent steps when the operating-switch is closed.

17. The combination of an electric motor; a speed-controller; a switch and a counter-weight attached to the controller and adapted to hold the switch in closed position.

18. The combination of an electric motor with switching contacts for the motor; a switching-bar and a controller, the controller being held from rotating toward off position by the switching-bar as it presses against the switching contacts.

19. In a switching mechanism for electric motors the combination of a controller moved through worm-gear by a pilot-motor and switch contacts sustaining the end thrust of the worm.

20. The combination of an electric motor, a reversing-switch, means for closing said switch, and a controller, the shaft of which is moved by the same means after the reversing-switch is closed.

21. The combination of an electric motor; a regulator; electromagnetic means dependent on the load upon the motor for intermittently operating the regulator, and a switch adapted to be closed by the same means before the regulator is moved.

22. The combination of an electric motor, a main switch for said motor, an operating-switch having only one closed and one open position, and intermediate means for closing said main switch and for starting the motor with a predetermined limit of the starting-current.

23. The combination of an electric motor, an operating-switch having only one closed and one open position, and intermediate means for starting the motor with a predetermined limit of acceleration.

24. The combination of an electric motor, an operating-switch having only one closed and one open position, and intermediate means for starting the motor with a predetermined limit of the starting-current and with a predetermined limit of acceleration.

25. In a reversing-switch for electric motors the combination of a pilot-motor operating two switching-levers and a rocking lever actuated by one of two magnets so as to cause the lifting of one of the switching-levers.

26. In a reversing-switch for electric motors, the combination of two switching-levers, means for lifting said levers, and means for causing one of the levers to close the circuit connections so as to start the motor.

27. In a reversing-switch for electric motors, the combination of two switching-levers, one rocking lever, an operating-switch and two magnets, one of which is energized through the operation of said operating-switch.

28. The combination of an electric motor: a circuit for the motor; a metallic strip included in the circuit; a branch circuit adapted to be closed by the strip when heated, and means for opening the motor-circuit, said means being included in the branch circuit.

29. The combination of an electric motor; a switch; a metallic strip heated by the current of the motor; a branch circuit adapted to be closed by the strip when heated; means for holding the switch closed, and means included in the branch circuit for opening the switch.

30. The combination of an electric motor; a circuit for the motor; a switch; means for holding the switch closed; a magnet for opening the switch; a contact for energizing the magnet by current derived from the motor-circuit, and a thermostatic device actuated by the motor-current for closing said contact.

31. The combination of an electric motor; a circuit and a switch for the motor; a metallic strip in the motor-circuit; a casing for the strip; a branch circuit including means for opening the switch, and a contact in the branch circuit touched by the strip when it reaches a predetermined temperature.

32. The combination of an electric motor; a regulator; a pilot-motor; a worm-gear; means for intermittently operating the regulator by the pilot-motor through the worm-gear, and means for disconnecting the worm-gear.

33. The combination of an electric motor; a regulator; a frame adapted to be rocked around a fulcrum; means mounted on the frame for operating the regulator; means for rocking the frame, and means for retarding the operation of the regulator.

In testimony whereof I have signed my name to this specification in the presence of two subscribing witnesses.

GUSTAF RENNERFELT.

Witnesses:
C. J. KINTNER,
M. F. KEATING.